July 17, 1962  A. S. BELL ET AL  3,044,914
HEAT-INSULATING MATERIALS
Filed Oct. 28, 1958
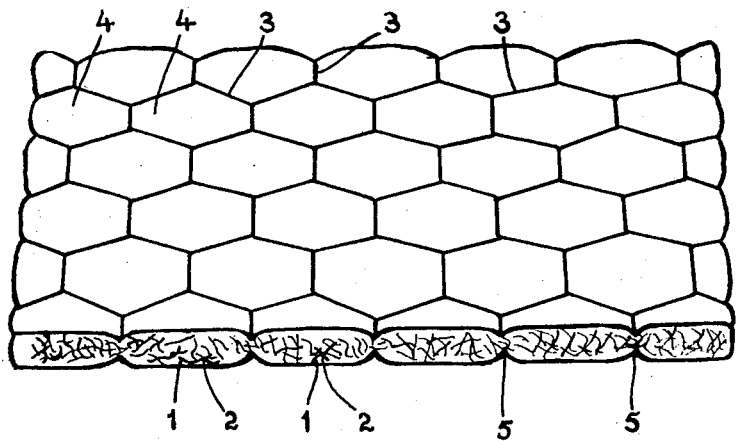
Inventors
Angus Smith Bell
John Smithies
James Anthony Briggs
By their attorneys
Howson and Howson

3,044,914
HEAT-INSULATING MATERIALS
Angus Smith Bell, Pinner, John Smithies, Thornham, Rochdale, and James Anthony Briggs, Croesyceilog, Cwmbran, England, assignors to British Celanese Limited, London, England, a British company
Filed Oct. 28, 1958, Ser. No. 770,116
Claims priority, application Great Britain Oct. 29, 1957
4 Claims. (Cl. 154—44)

This invention relates to heat-insulating materials and in particular to voluminous battings, composed of matted unspun staple fibres of which all or a substantial proportion are thermoplastic. By "unspun" is meant that the fibres are not twisted into yarns.

Fibrous materials of the kind referred to find many uses, e.g. as filling-material for quilts, as lining material for garments, as heat-insulating material for other purposes, e.g. in refrigerators, as packing material, as filter material and as absorbent material for surgical dressings and the like. In materials of the kind referred to the strength and cohesion are commonly less than could be desired to enable the material to be handled without damage and there is a tendency for fibres to stray off the surface. The present invention provides a material of the kind referred to, of improved strength and greater cohesion.

The heat-insulating material of the present invention comprises a batting of fibres, at least a substantial proportion of which are thermoplastic, bonded together by coalescence of thermoplastic fibres, whether one with another or with other fibres, at points distributed throughout the thickness of the material, said batting being embossed in a pattern of intersecting lines, the batting being compressed along the lines but advantageously not substantially compressed between the lines. Preferably, the depth of the embossing is such that the batting remains resilient at the lines.

At least 30 percent, and preferably at least 50 percent, e.g. 75 to 100 percent, by weight of the fibres in the batting should be thermoplastic. These thermoplastic fibres are preferably composed of cellulose acetate, containing 52 to 54 percent of combined acetic acid. Non-thermoplastic fibres which may be blended with the thermoplastic fibre in making the batting may be, for example, of cotton or regenerated cellulose. The staple length may range, for example, from 0.5 to 4 inch and the filament denier from 1 to 75. It is of considerable advantage for the fibres to be crimped, e.g. to the extent of 2 to 15 crimps per inch.

Other thermoplastic fibres that may be contained in the batting include those having a basis of a vinyl-type polymer such as polyvinyl chloride-acetate, vinylidene chloride-vinyl chloride copolymers, vinyl chloride-acrylontrile copolymers, vinylidene chloride-acrylontrile copolymers and other polymers of acrylontrile including homopolymers and polymers containing small proportions of vinyl pyridine, acrylamide and other components adapted to improve the dye affinity of polyacrylonitrile, fibre-forming polyamides, e.g. nylon 6, nylon 66, or nylon 610 and fibre-forming polyesters such as polyethylene terephthalate.

Cellulose acetate in fibres of the batting may be of low, medium or high acetyl value, e.g. acetyl value from 52 to 54 percent, or from 54 to 58 percent or from 58 to 62.5 percent, calculated as combined acetic acid.

The batting may be made by various methods. Excellent battings for use in the process of the invention can be made, for example, by a mechanical carding process including a final cross-lapping step in which the lap from the carding machine is folded on to a conveyor travelling at right angles to the direction of passage through the carder so building up a batting of the required thickness from a number of layers of lapping and at the same time securing a more nearly random arrangement of fibres. Another method is to deposit the fibres from an air stream on a foraminous surface, again securing a substantially random arrangement of fibres in the batting. Or a combination of mechanical with pneumatic carding can be employed.

By the methods referred to above extremely voluminous battings have been made, e.g. battings in which the apparent density is less than 2 lbs./cu. ft., e.g. 0.25 to 1 lb./cu. ft. Such battings are particularly suitable for treatment according to the invention but battings of higher density, e.g. 2 to 5 lbs./cu. ft. can also be treated with useful results. The battings treated may range in thickness from 1/8" to 4" but are preferably between 1/4" and 2" and specially between 1/2" and 1".

The bonding together of thermoplastic fibres at points distributed throughout the thickness of the material may be effected by heating the batting while substantially uncompressed, for instance, by directing hot air on to the batting to cause local incipient fusion of thermoplastic filaments. Other methods may be adopted, for instance other hot gases or vapours, e.g. steam, may be used in the same way. Or a substance which is a solvent for the thermoplastic material at the temperature of application may be caused in the form of vapour or a very fine spray to penetrate the material.

The bonding may be effected with the aid of a plasticiser for the thermoplastic material and this is particularly useful when the thermoplastic fibres are of cellulose acetate or other organic substitution derivative of cellulose. With such materials the necessary coalescence of the fibres at points distributed through the thickness of the material is difficult or impossible of attainment by the action of heat alone on the unplasticised fibres without serious damage to the material. This difficulty can be overcome by applying plasticiser preferably before forming the batting. The fibres, for instance, may be sprayed with plasticiser before carding or in the course of a carding operation or plasticiser may be sprayed on to a tow (spread out flat) which is subsequently converted, e.g. by cutting, into staple fibre from which the batting is formed. The nature and amount of plasticiser will depend on the nature of the thermoplastic material and the temperature at which the bonding is to be effected. In general the plasticiser should be a solvent or near solvent for the material at the bonding temperatures. Suitable plasticisers for bonding fibres of cellulose acetate containing 52 to 54 percent of combined acetic acid at temperatures within the range 100 to 180° C. include: triacetin, dimethyl phthalate, di-(methoxyethyl)phthalate, the di-(methylcyclohexyl)phthalates and tri-(monochlorethyl)phosphate alone or in admixture one with one another or with other plasticisers for cellulose acetate, e.g. diethyl phthalate, dibutyl phthalate and triphenyl phosphate. For such fibres the proportion of plasticiser may range from 5 to 25 percent, e.g. 10 to 20 percent, of the weight of the fibre.

The operation of embossing the batting involves depressing and heating the surface of the batting along the intersecting lines, thereby rendering the thermoplastic fibres plastic along said lines, and thereafter cooling the batting.

Preferably both surfaces of the batting are embossed. This may be done by passing the batting between two rotating cylindrical embossing members of such structure as to impart the desired pattern and heated to a suitably high temperature. The pattern, as indicated above, is one of intersecting lines and these may be straight or curved and of uniform or variable thickness. It is undesirable to glaze or compress substantially the areas of batting between the lines. Hence in the embossing members the parts corresponding to the lines to be embossed on the batting must project radially considerably beyond any parts of those members corresponding to the areas of batting between the lines. The embossing members may, for instance, comprise perforated drums or sleeves suitably driven, heated and urged together or set at a gap less than the thickness of the batting, the portions of surface remaining between the perforations forming the lines on the batting. The perforations may be in the form of polygonal figures such as squares, rectangles or regular hexagons, separated by straight lines of uniform width, or in the form of curved figures such as circles or ellipses separated by lines of varying width. For the perforated surface to be able to withstand the pressure necessary in embossing without being unduly massive it should preferably be supported internally. The surface may for instance be that of a sleeve fitting closely over the surface of a driving roll co-operating with a second roll also provided with a perforated sleeve, the two rolls being urged together or set at a distance predetermined in accordance with the thickness of the batting and the extent to which it is to be compressed along the lines of the pattern. Instead of perforated metal sleeves thick wire mesh or expanded metal sleeves may be used. The thickness of the perforated metal or the wire should be sufficient to enable the desired compression along the lines of the pattern to be effected without substantial compression of the area of batting between those lines by the rolls on which the sleeves are mounted.

The heating during embossing may be effected in various ways, e.g. by internal fluid heating, or gas heating, of the rolls or by directing hot air on to the material and sleeve in suitable regions, or by radiant or gas heating of the sleeve. The speed of the rolls is preferably variable so as to be able to control the time of contact of the material with the embossing surface. These surfaces may with advantage be provided with a coating of a material, e.g. polytetrafluorethylene or a silicone resin, of such a nature as to prevent those surfaces sticking to the batting during the embossing.

The following examples illustrate the invention.

Example 1

The apparatus used to effect the embossing was a two-bowl calender in which the bowls were separately driven at the same speed through variable speed driving means and in which each bowl was provided with a closely fitting perforated embossing sleeve, means being provided for heating these sleeves to a temperature of 150 to 200° C. The lower calender bowl was mounted in fixed bearings and the upper one in bearings capable of adjustment to vary the gap from zero to 2". The heating means consisted of a pair of arcuate electric resistance heaters, one positioned concentric with each bowl in such a position as to heat the sleeve carried by that bowl at the approach to the gap. The bowls were polished so that their surfaces acted as reflectors to minimize heating of the bowls themselves. The embossing sleeves were of steel ½" thick and perforated by regular hexagonal perforations all of the same size and forming a regular pattern and coated with a silicone resin. The hexagons may each be of about 0.6 inch measured across the flats.

The batting to be embossed was of weight 6 oz./sq. yd. and thickness about ½" and was made on a batting card from staple fibres of cellulose acetate containing 52 to 54 percent combined acetic acid and the fibres being 2" long, of filament denier 8 and with 10 crimps per inch. The fibres had been sprayed before carding with 15 percent of their weight of di-(methoxyethyl)phthalate. The batting had been heated to 140° C. for 1 minute in an oven to effect the bonding of the fibres at points distributed throughout the thickness.

The bearings of the upper calender bowl were set to give a gap of ⅛" between the surfaces of the embossing sleeves, the heaters were regulated so that the temperature of the sleeves approaching the gap was 180° C., the batting was fed to the gap and the bowl speed adjusted to give a time of contact of the batting with the embossing surfaces of 2.5 seconds.

The batting emerged with both surfaces embossed with a pattern of intersecting straight lines defining regular hexagons symmetrically arranged, the batting being compressed to about half its original thickness along these lines, and being resilient at these lines, but being substantially uncompressed between them.

The acompanying drawing shows in diagrammatic form in perspective a portion of an embossed batting in accordance with the invention and the foregoing example. Referring to the drawing, the batting comprises cellulose acetate fibres 1 bonded one to another by coalescence at points (such as 2) distributed throughout the batting. Both surfaces of the batting are embossed in a series of lines 3 forming a pattern of regular hexagons 4. As indicated at 5 the embossing is such that the batting is compressed along the lines but only to such an extent that it still remains resilient.

Example 2

The apparatus was as described in Example 1 except that the embossing surfaces were provided by two cylindrical cages of expanded metal having diamond shaped apertures between the meshes, of which there was one per inch. The gap was set, as before, at ⅛" and the heating adjusted to give a temperature at the approach to the gap of 170° C.

The batting treated differed from that of Example 1 in that it was of weight 4 oz./sq. yd. and the fibres were of filament denier 4.5.

This batting was run through the machine at such a speed as to give a ½-second contact time.

The product was similar to that of Example 1 except for the difference in pattern and the reduced thickness resulating from using a thinner batting.

Example 3

The process was carried out as in Example 2 except that the batting was made from a 75:25 percent mixture of plasticised fibres of the kind specified in that example and unplasticised regenerated cellulose fibres of the same length, denier and crimp.

Example 4

The process was carried out as in Example 2 except that the batting was made from a 50:50 percent mixture of plasticised fibres of the kind specified in that example and unplasticised cellulose triacetate fibres of the same length, denier and crimp.

In the apparatus used in these examples the axes of rotation of the embossing surfaces were in the same vertical plane. The plane containing these axes may, however, be inclined to the vertical to provide for longer times of contact for a given throughput.

What we claim is:

1. Heat-insulating material comprising a batting of staple fibers of which at least a substantial proportion are thermoplastic fibers, substantially all the fibers throughout the batting being bonded together by coalescence, the batting being embossed in a pattern of intersecting lines and compressed only at said embossed lines to a depth and only to a depth such that the batting is resilient at the lines; the batting remaining uncompressed except at said lines.

2. Heat-insulating material according to claim 1, wherein the thermoplastic fibres are fibres of cellulose acetate.

3. Heat-insulating material according to claim 2, wherein the batting is composed wholly of cellulose acetate fibres.

4. Process for the manufacture of a heat-insulating material, which comprises heating a substantially uncompressed batting of staple fibres, the batting including at least 30 percent by weight of fibres of cellulose acetate carrying a plasticiser for the cellulose acetate, whereby bonding together of substantially all the fibres is effected throughout the batting, and embossing the surface of the batting in a pattern of intersecting lines, the batting being compressed only along the lines and only to such a depth that it remains resilient along said lines.

References Cited in the file of this patent

UNITED STATES PATENTS

| | | |
|---|---|---|
| 1,996,043 | Gaarder | Mar. 26, 1935 |
| 2,321,108 | Schneider | June 8, 1943 |
| 2,464,301 | Francis | Mar. 15, 1949 |
| 2,609,539 | Shearer | Sept. 9, 1952 |

FOREIGN PATENTS

| | | |
|---|---|---|
| 582,006 | Great Britain | Nov. 1, 1946 |